(12) United States Patent
Nath et al.

(10) Patent No.: US 10,499,159 B2
(45) Date of Patent: Dec. 3, 2019

(54) METHOD OF FABRICATING A MINIATURE DEVICE HAVING AN ACOUSTIC DIAPHRAGM

(71) Applicant: Bose Corporation, Framingham, MA (US)

(72) Inventors: Prateek Nath, Southborough, MA (US); Shawn Prevoir, Northborough, MA (US); Wit Bushko, Milford, MA (US)

(73) Assignee: BOSE CORPORATION, Framingham, MA (US)

( * ) Notice: Subject to any disclaimer, the term of this patent is extended or adjusted under 35 U.S.C. 154(b) by 161 days.

(21) Appl. No.: 15/598,065

(22) Filed: May 17, 2017

(65) Prior Publication Data

US 2018/0338207 A1 Nov. 22, 2018

(51) Int. Cl.
*H04R 9/06* (2006.01)
*B29C 65/48* (2006.01)
(Continued)

(52) U.S. Cl.
CPC .......... *H04R 9/06* (2013.01); *B29C 65/4845* (2013.01); *B29C 66/731* (2013.01); *H04R 7/04* (2013.01);
(Continued)

(58) Field of Classification Search
CPC ... H04R 9/06; H04R 7/20; H04R 7/04; H04R 31/003; H04R 2307/00; H04R 2231/003;
(Continued)

(56) References Cited

U.S. PATENT DOCUMENTS 2,657,758 A * 11/1953 Pierre Varnet ......... H04R 9/045
181/164
3,851,037 A * 11/1974 Day et al. .......... B29D 99/0053
264/229

(Continued)

FOREIGN PATENT DOCUMENTS

DE 533786 C 9/1931
DE 10303247 A1 8/2014

OTHER PUBLICATIONS

U.S. Appl. No. 15/182,069, filed Jun. 14, 2016; 20 pages.
(Continued)

*Primary Examiner* — Oyesola C Ojo
(74) *Attorney, Agent, or Firm* — Schmeiser, Olsen & Watts LLP; William G. Guerin

(57) ABSTRACT

A method of forming a device having a compliant member includes providing an elastomeric layer in an uncured state. The elastomeric layer is pre-cured to increase its viscosity. Subsequently, a bobbin and housing, each having an end, can be positioned such that their ends extend at least partially into the elastomeric layer. The elastomeric layer is cured to secure it to the bobbin housing. Examples of pre-cure and cure operations include one or more of a thermal cure, evaporative cure and ultraviolet cure, and the application of moisture, microwave energy and chemical additive. Due to the increased viscosity after the pre-cure, the migration of elastomeric material is substantially reduced relative to an uncured elastomeric material. The reduction in elastomeric material migration results in smaller menisci formed along the walls of the housing and bobbin, and reduced thinning of the compliant member formed at their ends.

15 Claims, 9 Drawing Sheets

(51) Int. Cl.
*B29C 65/00* (2006.01)
*H04R 7/04* (2006.01)
*H04R 31/00* (2006.01)
*H04R 7/20* (2006.01)
*B29K 105/00* (2006.01)
*B29K 83/00* (2006.01)
*B29L 31/34* (2006.01)

(52) U.S. Cl.
CPC ............ *H04R 7/20* (2013.01); *H04R 31/003* (2013.01); *B29K 2083/00* (2013.01); *B29K 2105/0097* (2013.01); *B29K 2995/0001* (2013.01); *B29L 2031/3418* (2013.01); *H04R 2231/001* (2013.01); *H04R 2231/003* (2013.01); *H04R 2307/00* (2013.01); *H04R 2307/025* (2013.01)

(58) Field of Classification Search
CPC ........ H04R 2231/001; H04R 2307/025; B29C 66/731; B29C 65/4845; B29K 2105/0097; B29K 2083/00; B29K 2995/0001; B29L 2031/3418
See application file for complete search history.

(56) References Cited

U.S. PATENT DOCUMENTS

| | | | | | |
|---|---|---|---|---|---|
| 4,088,847 | A * | 5/1978 | Yukimoto | ............. | H04R 9/046 381/400 |
| 4,395,598 | A * | 7/1983 | Lesage | ................... | H04R 9/06 181/172 |
| 4,410,768 | A * | 10/1983 | Nakamura | ............... | H04R 7/02 181/167 |
| 4,817,165 | A * | 3/1989 | Amalaha | ................ | H04R 7/122 181/170 |
| 5,472,736 | A * | 12/1995 | Barr | ....................... | G11B 5/313 427/123 |
| 5,566,242 | A * | 10/1996 | Hall | ........................ | H04R 1/025 181/148 |
| 6,757,404 | B2 * | 6/2004 | Takewa | .................... | H04R 7/12 181/174 |
| 8,107,665 | B2 | 1/2012 | Haapapuro et al. | | |
| 9,049,511 | B2 * | 6/2015 | Shen | ........................ | H04R 7/10 |
| 9,888,306 | B2 * | 2/2018 | Worrell | ................... | H04R 1/023 |
| 9,955,266 | B2 * | 4/2018 | Liu | ........................... | H04R 7/06 |
| 2006/0062422 | A1 | 3/2006 | Ono et al. | | |
| 2006/0266577 | A1 * | 11/2006 | Inoue | ....................... | H04R 7/10 181/167 |
| 2011/0317869 | A1 | 12/2011 | Fujitani et al. | | |
| 2012/0018611 | A1 * | 1/2012 | Ishii | ....................... | B81B 7/0058 248/636 |
| 2012/0263338 | A1 * | 10/2012 | Hori | ......................... | H04R 3/02 381/398 |
| 2013/0279729 | A1 | 10/2013 | Richards | | |
| 2014/0241565 | A1 | 8/2014 | Jin | | |
| 2015/0312660 | A1 * | 10/2015 | Lembacher | .............. | H04R 7/10 381/396 |
| 2015/0326975 | A1 * | 11/2015 | Takada | .................... | H04R 3/00 381/407 |
| 2016/0121814 | A1 * | 5/2016 | Foss | .................... | B60R 13/0815 181/290 |
| 2016/0185036 | A1 | 6/2016 | Yamasaki et al. | | |
| 2017/0078800 | A1 | 3/2017 | Guthy et al. | | |
| 2017/0129143 | A1 * | 5/2017 | Otto | ........................ | B29C 41/003 |
| 2017/0359657 | A1 | 12/2017 | Bushko et al. | | |
| 2018/0338207 | A1 | 11/2018 | Nath et al. | | |

OTHER PUBLICATIONS

Final Office Action in U.S. Appl. No. 15/182,069, dated Oct. 11, 2017; 9 pages.
International Search Report and Written Opinion in PCT/US2018/039281 dated Oct. 2, 2018; 14 pages.
International Preliminary Report on Patentability in PCT/US2017/033283 dated Dec. 27, 2018; 10 pages.
Non-Final Office Action in U.S. Appl. No. 15/661,155 dated Jan. 9, 2019; 8 pages.
Notice of Allowance in U.S. Appl. No. 15/875,866, dated Feb. 4, 2019; 10 pages.
Notice of Allowance in U.S. Appl. No. 15/661,155 dated Jun. 11, 2019; 7 pages.
Corrected Notice of Allowability in U.S. Appl. No. 15/661,155 dated Aug. 9, 2019; 2 pages.
Notice of Allowance in U.S. Appl. No. 15/182,069 dated Sep. 19, 2017; 11 pages.
Restriction Requirement in U.S. Appl. No. 15/182,069, dated Jun. 8, 2017; 5 pages.
Non-Final Office Action in U.S. Appl. No. 15/182,069, dated Jul. 6, 2017; 12 pages.
International Search Report & Written Opinion in International Patent Application No. PCT/US17/033283, dated Aug. 11, 2017; 15 pages.
International Search Report and Written Opinion in International Patent Application No. PCT/US18/28788, dated Jun. 25, 2018; 16 pages.
"How to make silicone molds," Colorful-crafts.com, Jun. 23, 2016.

* cited by examiner

METHOD OF FABRICATING A MINIATURE DEVICE HAVING AN ACOUSTIC DIAPHRAGM

BACKGROUND

This disclosure relates to a miniature device having a compliant member. More particularly, the disclosure relates to a method of fabricating an acoustic diaphragm on the miniature device.

SUMMARY

In one aspect, a method of fabricating a device having a complaint member includes providing an elastomeric layer in an uncured state. The elastomeric layer is pre-cured to increase a viscosity of the elastomeric layer. One or more of a bobbin and a housing, each having an end, are positioned such that the end of the one or more of a bobbin and a housing extends at least partially into the elastomeric layer. The elastomeric layer is cured such that the elastomeric layer is secured to the one or more of the bobbin and the housing.

Examples may include one or more of the following features:

The pre-curing may include applying heat to the elastomeric layer to increase a temperature of the elastomeric layer to a first temperature and the curing of the elastomeric layer may include applying heat to the elastomeric layer to increase the temperature of the elastomeric layer to a second temperature that is greater than the first temperature. The pre-curing may occur for a first duration and the curing may occur for a second duration, wherein the first duration is less than the second duration.

The pre-curing may include irradiating the elastomeric layer with ultraviolet light for a first duration and the curing may include irradiating the elastomeric layer with ultraviolet light for a second duration, wherein the second duration is greater than the first duration.

The pre-curing of the elastomeric layer may include irradiating the elastomeric layer with ultraviolet light at a first irradiance and the curing of the elastomeric layer comprises irradiating the elastomeric layer with ultraviolet light at a second irradiance, wherein the second irradiance is greater than the first irradiance.

The pre-curing may include applying heat to the elastomeric layer and irradiating the elastomeric layer with ultraviolet light. The curing may include applying heat to the elastomeric layer and irradiating the elastomeric layer with ultraviolet light.

The elastomeric layer may be secured to the bobbin and the housing, and the method may further include removing a portion of the elastomeric layer that extends outside a diameter of the housing.

The elastomeric layer in an uncured state may include liquid silicone rubber.

The positioning of the one or more of a bobbin and a housing may further include positioning the bobbin inside the housing.

In accordance with another aspect, a device includes a compliant member and one or more of a bobbin and a housing. The compliant member has a substantially planar shape and is formed of a single layer of a cured elastomeric material. Each of the one or more of a bobbin and a housing has an end that extends at least partially into the compliant member. The elastomeric material adheres to a portion of the housing and/or bobbin at the end of the housing and/or bobbin to form a meniscus having a height defined along a wall of the housing and/or bobbin. The height of the meniscus is less than a height of a meniscus formed along the wall of the housing and/or bobbin for an uncured state of the elastomeric material.

Examples may include one or more of the following features:

The housing may be a tube having an opening at the end. The elastomeric material may include a silicone rubber.

The compliant member may include a meniscus formed at each of an inner wall surface of the housing and/or bobbin and an outer wall surface of the housing and/or bobbin.

In accordance with another aspect, a microspeaker device includes an acoustic diaphragm, a housing, a bobbin and a coil. The acoustic diaphragm has a substantially planar shape and formed of a single layer of a cured elastomeric material. The housing has an end extending at least partially into the single layer. The single layer adheres to a portion of the housing at the end of the housing to form a first meniscus having a height defined along a wall of the housing. The height of the first meniscus is less than a height of a meniscus along the wall of the housing for an uncured state of the elastomeric material. The bobbin is disposed inside the housing and has a surface and an end extending at least partially into the single layer. The single layer adheres to a portion of the bobbin at the end of the bobbin to form a second meniscus having a height defined along a wall of the bobbin. The height of the second meniscus is less than a height of a meniscus along the wall of the bobbin for the uncured single layer of the elastomeric material. The coil is wound on the surface of the bobbin.

Examples may include one or more of the following:

The housing and the bobbin may be formed of different materials.

The height of the first meniscus may be different from the height of the second meniscus.

The first meniscus may include a first inner meniscus having a height along an inner wall surface of the housing and a first outer meniscus having a height along an outer wall surface of the housing and the second meniscus may include a second inner meniscus having a height along an inner wall surface of the bobbin and a second outer meniscus having a height along an outer wall surface of the bobbin.

BRIEF DESCRIPTION OF THE DRAWINGS

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Modern in-ear headphones, or earbuds, typically include microspeakers. The microspeaker may include a coil that is attached to an acoustic diaphragm either directly or through a bobbin on which the coil is wound. Motion of the diaphragm due to an electrical signal provided to the coil results in generation of an acoustic signal that is responsive to the electrical signal. The microspeaker typically includes a housing, such as a sleeve or tube, which encloses the bobbin, coil and a magnetic structure. As the size of the earbud decreases, it becomes increasingly difficult to fabricate the acoustic diaphragm with an elastic suspension at one end of the bobbin (or coil) and housing.

Figure 1A:
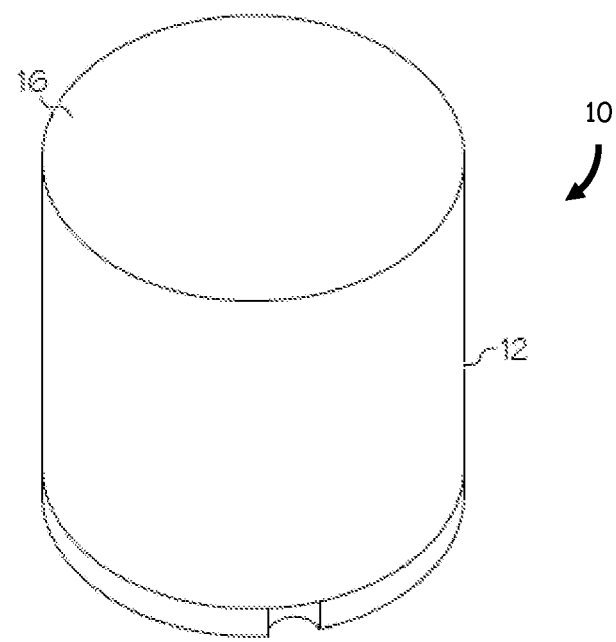
FIG. 1A, FIG. 1B and FIG. 1C are a perspective illustration, a perspective cutaway illustration and an exploded cutaway illustration, respectively, of an example of a microspeaker for a miniature earbud.
Figure 1B:
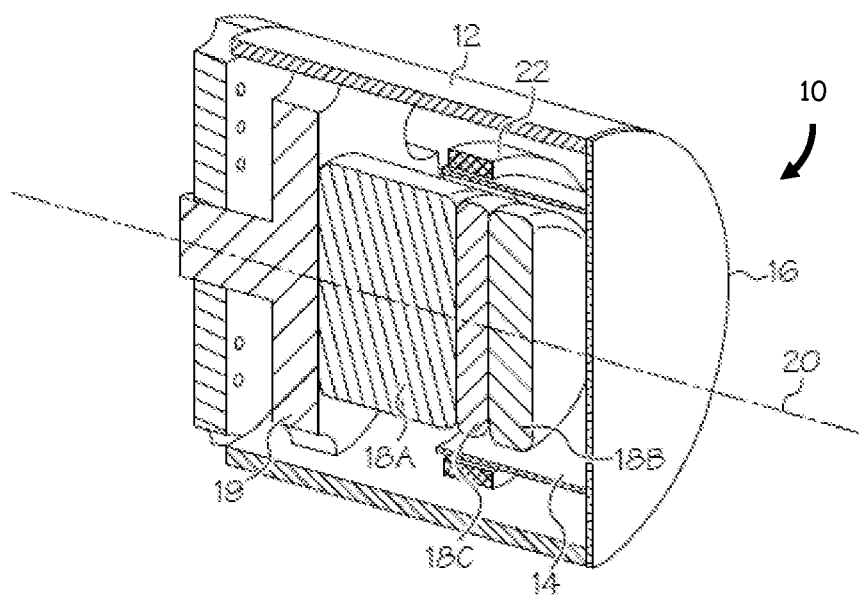
Figure 1C:
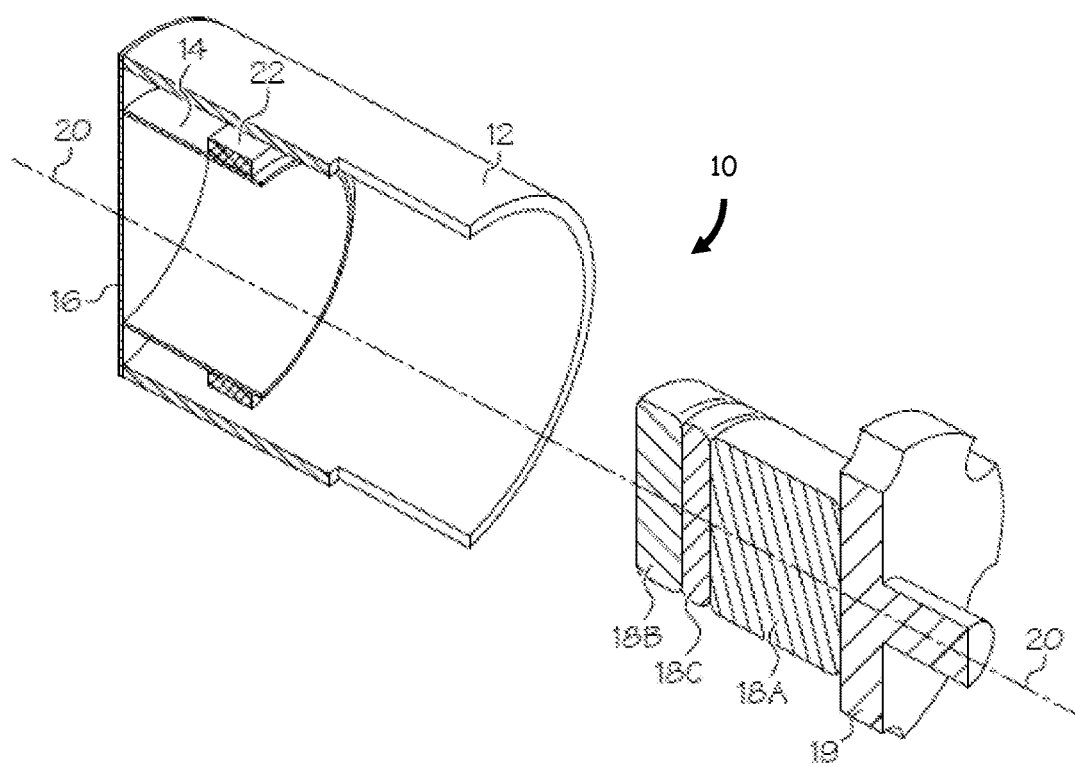

FIG. 1A, FIG. 1B and FIG. 1C are a perspective illustration, a perspective cutaway illustration and an exploded cutaway illustration, respectively, of an example of a microspeaker 10 that can be used in a miniature earbud. The microspeaker 10 includes a cylindrical housing 12 having an opening at both ends. Inside the housing 12 is a bobbin 14 that is nominally cylindrical in shape and which is open at least at one end. The housing 12 and bobbin 14 are secured at one of their ends to a compliant member 16. In some examples, the housing 12 is made of stainless steel and the bobbin 14 is made of a polyimide (e.g., KAPTON®) or polyethylene terephthalate (PET) (e.g., MYLAR®). A magnet assembly 18 is secured to a platform 19 at an end of the housing 12 that is opposite to the compliant member 16. The magnet assembly 18 includes two magnet pieces 18A and 18B separated by a coin 18C. The magnet assembly 18 extends along an axis 20 of the housing 12 and into an open region inside the bobbin 14. In one example, the magnet pieces 18A and 18B are cylindrical neodymium magnets. A coil 22 is wound onto an outside surface of the bobbin 14. The bobbin 14 moves substantially along the housing axis 20 in response to an electrical current conducted through the coil 22. In turn, a central circular portion of the compliant member 16 moves axially and displaces air to thereby create an acoustic signal.

One technique for fabricating the compliant member 16 includes placing an open end of the housing 12 and an open end of the bobbin 14 into a single thin layer of liquid silicone rubber. The liquid silicone rubber is then cured to form the compliant member 16. The central region of the compliant member 16 that is located within the end region of the bobbin can be stiffened while the annular region that surrounds the central region remains compliant. Difficulties arise with this technique as the liquid silicone has a surface tension that causes the liquid to adhere to and "climb up" the walls of the housing 12 and the bobbin 14 to form a meniscus. The migration of the liquid silicone to the walls can occur quickly, for example, within a few seconds of placing the ends of the housing 12 and bobbin into the liquid silicone rubber. The result of the migration is a reduction in the thickness of the layer of silicone which can lead to holes in the compliant member 16. Holes can form during the demolding process because the compliant member 16 is weakened at the thinned areas. In addition, thinned areas may result in tearing or holes being formed in the compliant member 16 during operation of the microspeaker 10.

Figure 2:
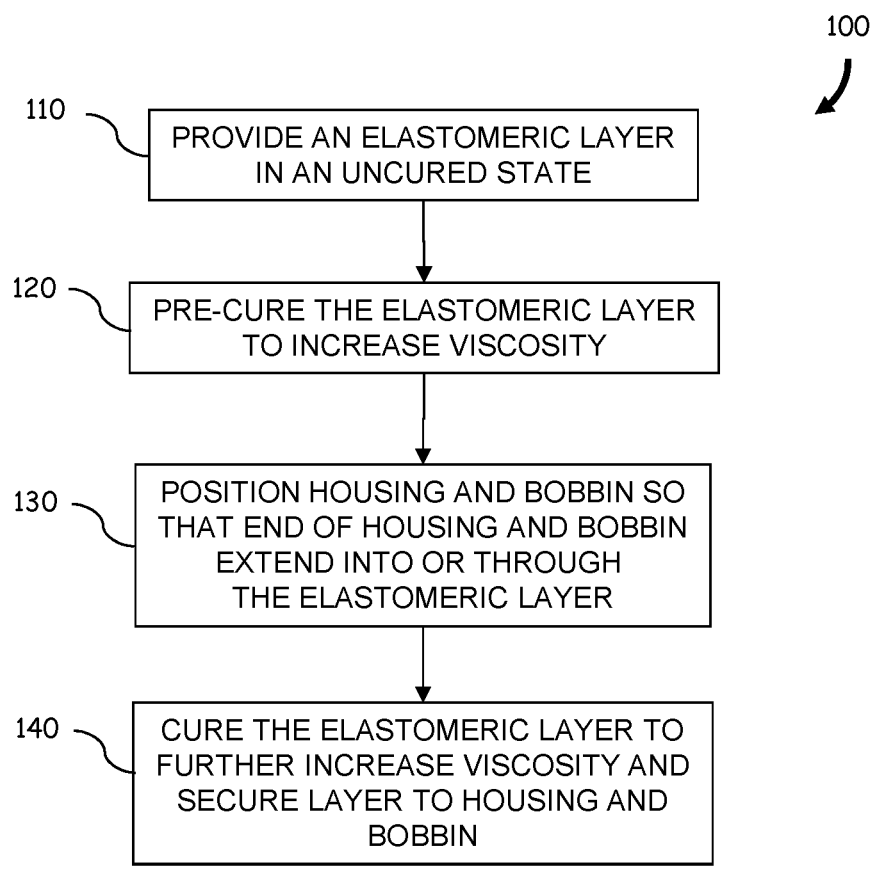
FIG. 2 is a flowchart representation of an example of a method of forming a device having a compliant member.
Figure 3A:
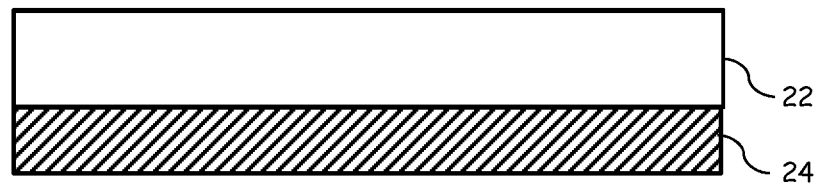
FIG. 3A, FIG. 3B and FIG. 3C are cross-sectional illustrations showing sequentially how the method of FIG. 2 is applied to fabricate a microspeaker device.
Figure 3B:
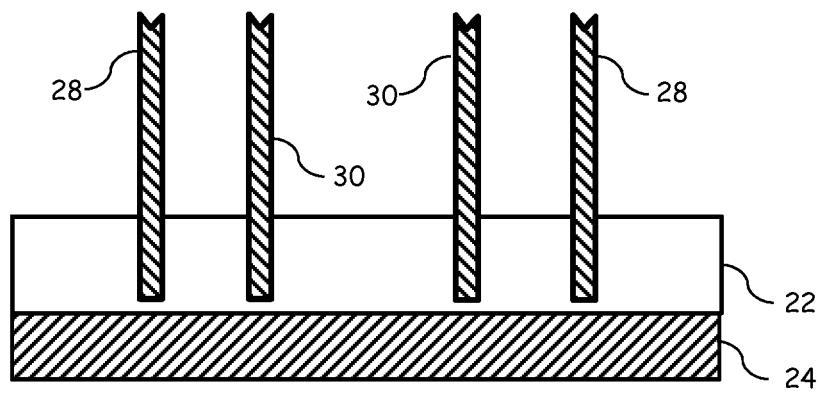
Figure 3C:
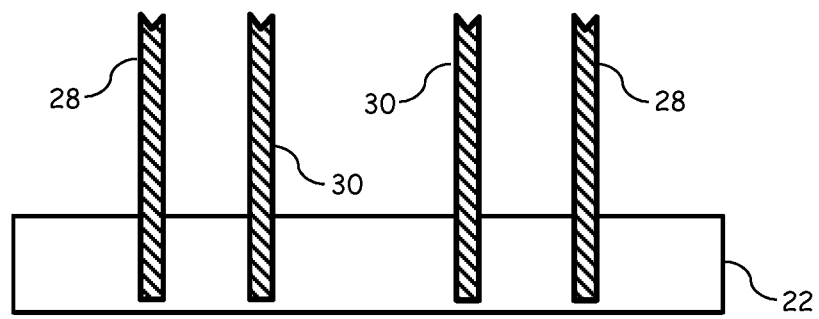

FIG. 2 is a flowchart representation of an example of a method 100 of fabricating a device having a compliant member. Reference is also made to FIGS. 3A to 3C which are cross-sectional side view illustrations showing, in a sequential manner, the method 100 as applied to fabrication of a microspeaker device in which the compliant member can subsequently be processed to form an acoustic diaphragm and a surround.

According to the method 100, an elastomeric layer 22 is provided (110) in an uncured state as shown in FIG. 3A. The elastomeric layer 22 may be a thermoset rubber such as a silicone rubber or a polyurethane which can be subsequently cured, for example, by the application of heat (thermal curing), air (evaporation curing), moisture, microwave energy, ultraviolet (UV) radiation and/or chemical additive. The elastomeric layer 22 is provided on a release liner 24 that is removed at a later time during the fabrication process. The viscosity of the silicone generally is sufficient such that the thickness of the applied layer does not significantly change although surface features and bumps typically disappear over time until the surface is substantially flat. By way of specific non-limiting examples, the silicone rubber may be an ELASTOSIL® 3070 Series self-adhesive liquid silicone rubber available from Wacker Chemie AG of Munich, Germany, the polyurethane may be MPP-W43C polyurethane gel or GK-22 polyurethane gel, both available from Northstar Polymers, LLC of Minneapolis, Minn., and the liner 24 may be a 40 μm thick LOPAREX® 5100 Series fluorosilicone release liner available from LOPAREX LLC of Cary, N.C. The thickness of the uncured elastomeric layer 22 may vary according to particular application requirements. By way of a specific non-limiting example, the thickness of the uncured elastomeric layer 22 may be in a range from about 50 μm to about 100 μm.

The elastomeric layer 22 is pre-cured (120) to increase its viscosity. As used herein, "pre-cure" means increasing the viscosity of the elastomeric material so that it is more viscous than the originally-provided elastomeric material and less viscous than the elastomeric material in a fully-cured state. The material is partially cured to attain a viscosity at or just below the gel point, which is defined as the crossover point of the storage modulus and loss modulus. Above this viscosity, the material exhibits elastic-like behavior and potting the components into the elastomer is no longer possible. Thus a pre-cured material is more resistant to flow than the uncured material while a material that has been cured (i.e., is fully-cured) is generally in a toughened or hardened state and is not subject to flow. The viscosity of the elastomeric material generally increases with increasing cure fraction although the change in viscosity with cure fraction is not necessarily linear.

Subsequent to the pre-cure, a housing 28 and bobbin 30 (only end portions illustrated) are positioned (130) such that their ends extend at least partially into the elastomeric layer 22 as shown in FIG. 3B. In one example, the housing 28 is in the form of a hollow cylindrical tube and the bobbin 30 is configured to move in a bi-directional manner along the tube axis. The housing 28 and bobbin 30 may be positioned at the same time. Alternatively, the housing 28 and bobbin 30 may be positioned at different times as long as the viscosity of the elastomeric material does not significantly change between the times of positioning of the two items. Due to the increased viscosity after the pre-cure, the migration of the elastomeric material is substantially reduced relative to what would otherwise occur for the uncured elastomeric material. The reduction in elastomeric material migration results in smaller menisci formed along the walls of the housing 28 and bobbin 30 as described further below.

The elastomeric material is cured (140) so that the ends of the housing 28 and bobbin are secured to the elastomeric layer 22. The release liner 24 is then removed so that the elastomeric layer 24 remains as a substantially planar compliant member that adheres to the end of the housing 28 and the bobbin 30. The central region of the compliant member, (i.e., the area defined within the diameter of the bobbin 30) can be stiffened to form the acoustic diaphragm. The annular area surrounding the central region defines a compliant surround that can support the bobbin 30 and coil, and enables the acoustic diaphragm to moves axially to thereby generate an acoustic signal. The portion of the compliant member that extends beyond the outer diameter of the housing 28 may be removed by any of a variety of techniques such as by trimming or using a punch tool.

Figure 4:
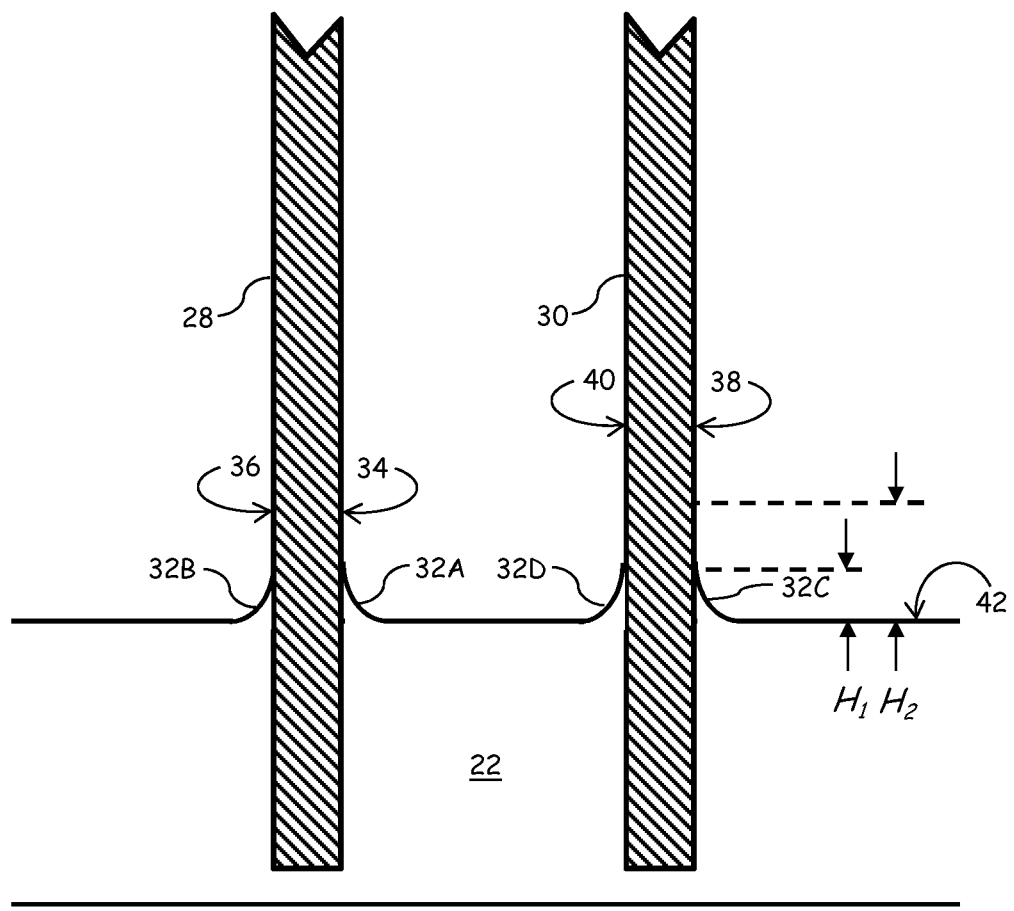
FIG. 4 is a magnified view of a portion of the end of the microspeaker device of FIG. 3C showing menisci formed at the housing and bobbin walls.

FIG. 4 shows a magnified cross-sectional view of a portion of the ends of the housing 28 and bobbin 30 corresponding to the left side of FIG. 3C. A meniscus 32 is formed at locations where the elastomeric material has climbed (vertical migration in the figure) the walls of the housing 28 and bobbin 30. Thus there is an inner meniscus 32A and an outer meniscus 32B along an inner wall surface 34 and an outer wall surface 36, respectively, of the housing 28. Similarly, there is an inner meniscus 32C and an outer meniscus 32D along an inner wall surface 38 and an outer wall surface 40, respectively, of the bobbin 30. Each meniscus 32 has a height $H_1$ defined from the top surface 42 of the elastomeric layer 22. The menisci 32 are formed during a period of time starting when the ends of the housing 28 and bobbin 30 are first positioned in the pre-cured elastomeric layer 22. All menisci 32 are shown as having the same height $H_1$; however, the heights along the two walls may differ due to a difference in material migration along the walls according to differences in the wall materials.

FIG. 4 shows that the bottom of the walls are not coincident with the bottom of the elastomeric layer 22 as there is some affinity between the elastomeric material and the wall regardless of the pre-cure viscosity. The distance from the bottom of the walls to the bottom of the layer 22 is affected by the viscosity increase achieved during pre-cure.

Due to the increased viscosity of the pre-cured elastomeric layer 22 and the corresponding reduction in material migration, the height $H_1$ of the menisci 32 is substantially less than a height $H_2$ of the menisci that otherwise would have formed using an uncured elastomeric layer. As a result, less thinning occurs and there is a substantial reduction in thickness variations across the elastomeric layer 22. Advantageously, the fabricated device is easier to remove from the release liner (not shown) without tearing or generating holes. Moreover, the opportunity for holes or tears to be generated during operation of a microspeaker device fabricated with the compliant member is reduced or eliminated. An additional advantage is a more consistent stiffness of the suspension defined by the peripheral portion of the compliant member that surrounds the inner acoustic diaphragm. It should be noted that the elimination of the menisci 32 is not a goal as they represent an increased area of adherence to the walls of the housing 28 and bobbin 30, and tearing can occur when the release liner is removed if no menisci are present.

In addition, the menisci 32 limit the stress concentration at the joint between the elastomer and the housing and bobbin walls.

Figure 5:
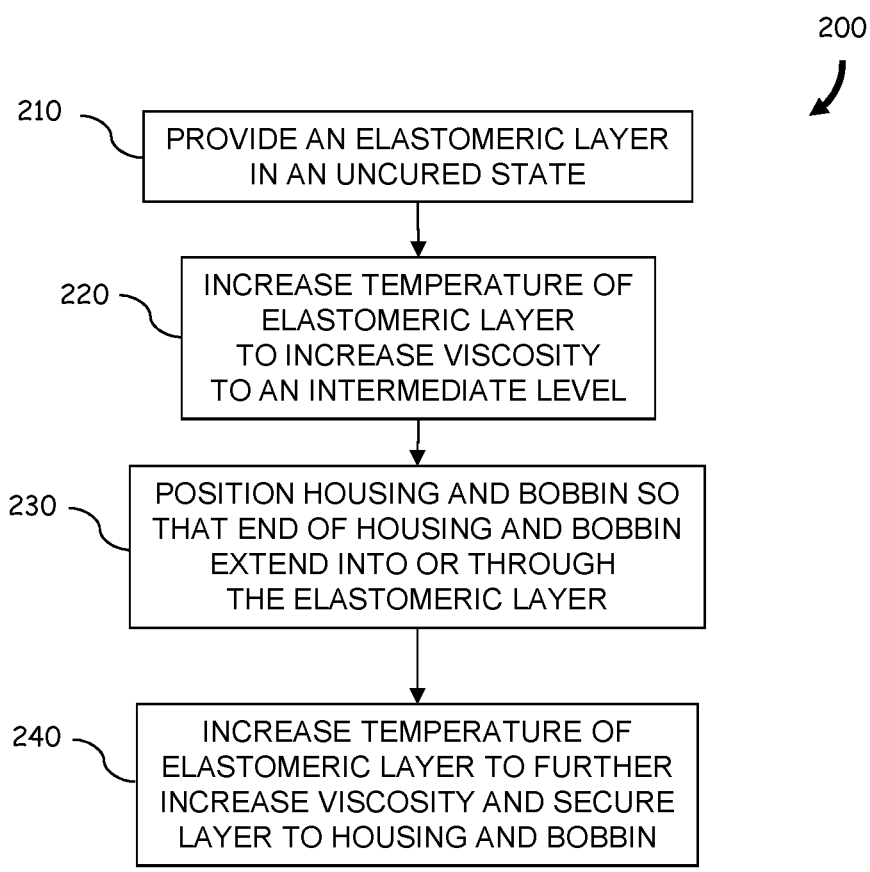
FIG. 5 is a flowchart representation of an example of a method that uses a thermal pre-cure and cure to form a device having a compliant member.
Figure 6:
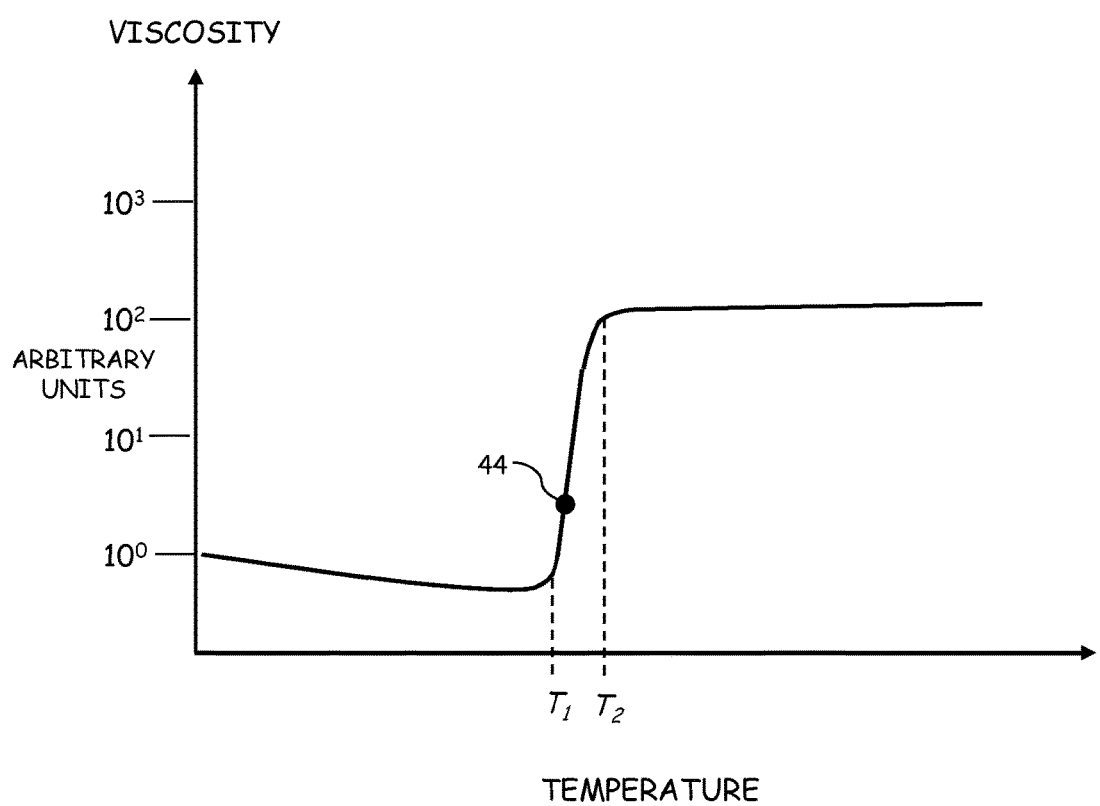
FIG. 6 is a graphical depiction of a relationship between viscosity and temperature for an elastomeric material that is suitable for a heat cure.

Reference is made to FIG. 5 which shows a flowchart representation of an example of a method 200 of fabricating a device having a compliant member in which the fabrication utilizes a thermal pre-cure and thermal cure. An elastomeric layer is provided (210) in an uncured state and the temperature of the layer is increased (220) to increase the viscosity of the elastomeric material to an intermediate level (i.e., a level that is less than the viscosity for a full cure). Reference is also made to FIG. 6 which shows a relationship between viscosity and temperature for an example of a silicone elastomer that is suitable for a heat cure. Below a temperature $T_1$, the viscosity decreases slightly with increasing temperature. Between the temperature $T_1$ and a greater temperature $T_2$, the viscosity increases rapidly with temperature. The viscosity may change by a factor of approximately 100 or more between temperatures $T_1$ and $T_2$. At temperatures greater than $T_2$, the viscosity increases gradually with increasing temperature.

For a thermal pre-cure, heat is applied to the elastomeric layer to increase its temperature to greater than temperature $T_1$ but well below temperature $T_2$. By way of a non-limiting example, the pre-cure temperature of the elastomeric layer may be in a range from about 35° C. to about 100° C. Point 44 indicates one example of a pre-cure operating temperature. The result of the pre-cure operation is a sufficient increase in viscosity such that the elastomeric material is more resistant to flow and to the formation large menisci while still allowing the ends of the housing and bobbin to be placed properly in the elastomeric layer. For example, the elastomeric layer on a release liner may be passed through a process line oven, or by one or more heater lamps or elements, to achieve the desired temperature. By way of example, the duration in which the elastomeric layer is at the pre-cure temperature may be less than a minute to more than ten minutes. It will be appreciated that the selected temperature and duration of the pre-cure will vary according to the physical properties of the particular elastomeric material and according to the desired height $H_1$ of the menisci 32 (see FIG. 4).

After passing through the oven or by the heaters, the housing and bobbin are positioned (230) in the elastomeric layer. In an alternative example, the housing and bobbin may be positioned while the elastomeric layer and release liner are at the elevated pre-cure temperature.

After placement of the housing and bobbin is completed, heat is applied to increase (240) the temperature of the elastomeric layer to a temperature substantially greater than $T_2$ to fully cure the elastomeric layer. The duration of the cure is significantly longer than the duration of the pre-cure. The duration of the cure can be several hours or more (e.g., a cure temperature of 150° C. for a four hour duration).

In some manufacturing environments, the pre-cure is performed in a separate thermal environment from the cure operation. More specifically, the pre-cure may be performed using a process line oven or one or more heaters, and the cure may be performed using a separate oven or heater configuration. In this manner, the longer duration of the cure does not limit the part throughput of the process line and the cure oven is used as a separate batch process.

Figure 7:
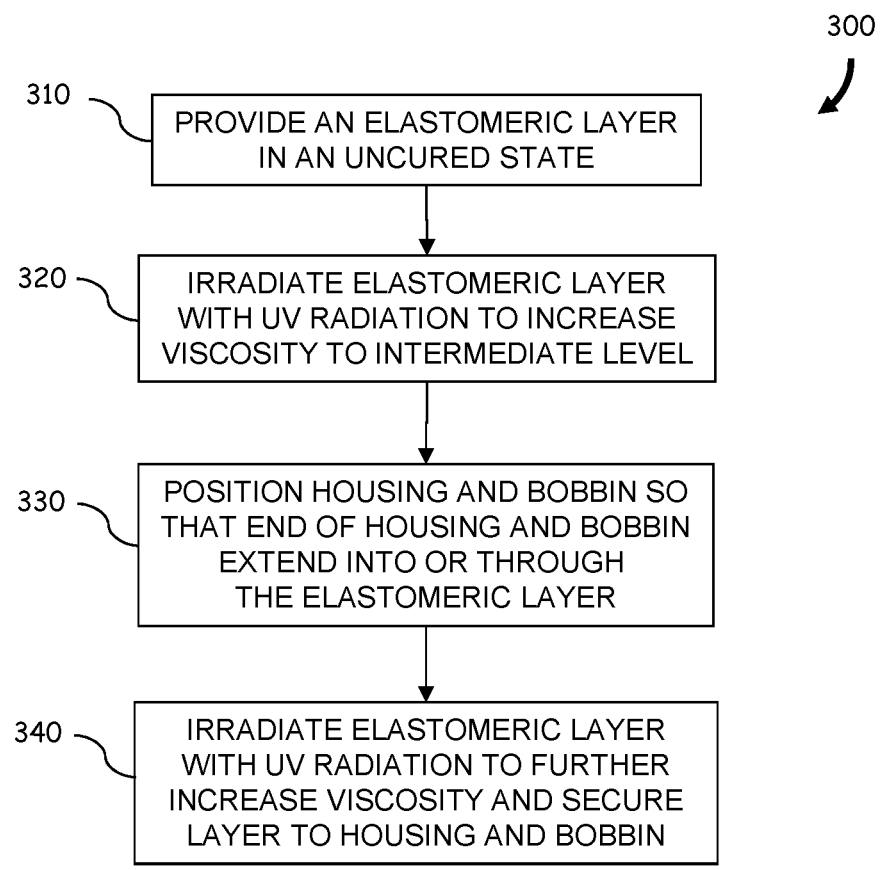
FIG. 7 is a flowchart representation of an example of a method that uses an ultraviolet irradiation pre-cure and cure to form a device having a compliant member.
Figure 8:
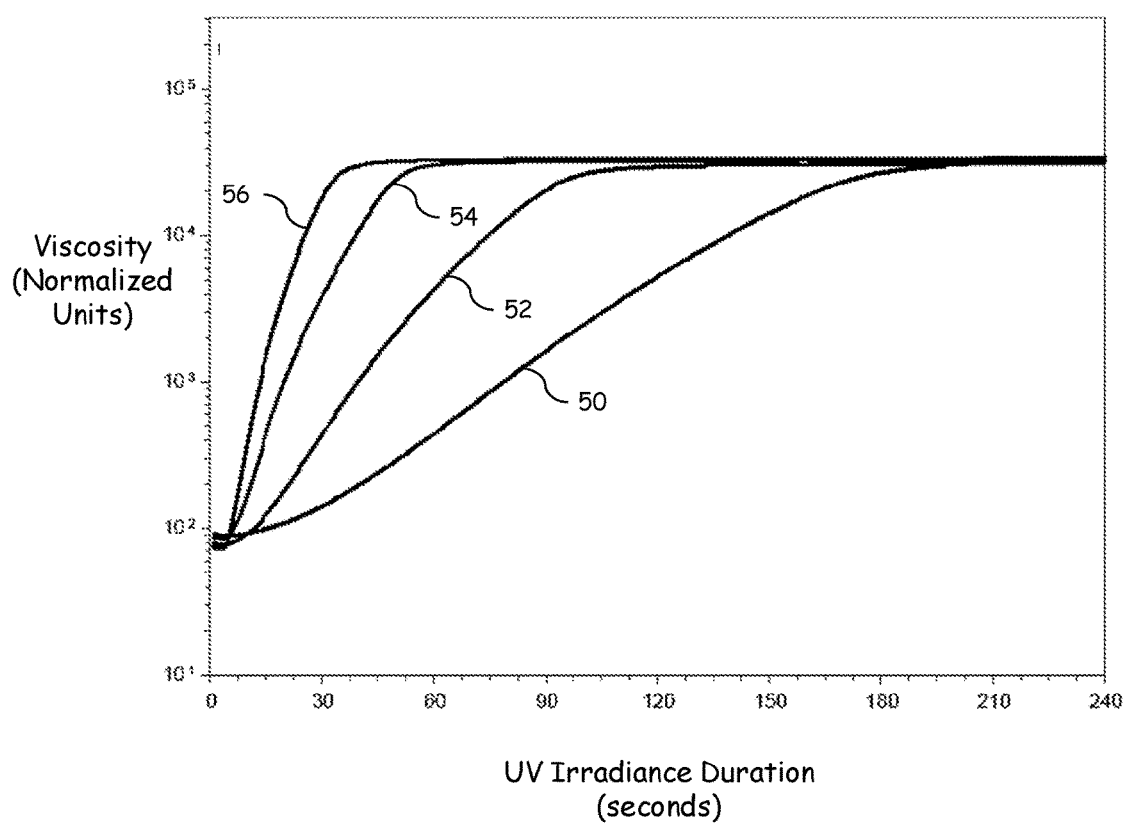
FIG. 8 is a graphical depiction of viscosity as a function of both irradiance and duration of UV exposure for a UV-curable elastomeric material.

FIG. 7 shows a flowchart representation of an example of a method 300 of fabricating a device having a compliant member in which the fabrication utilizes a UV pre-cure and UV cure. Reference is also made to FIG. 8 which shows viscosity as a function of both irradiance and duration of UV exposure for a UV-curable elastomeric material (UV Electro 225 (UV curing Silopren™ liquid silicone rubber) available from MOMENTIVE™ of Westford, N.Y.). The figure shows the storage modulus as a function of UV irradiance duration for irradiances of 2 mW/cm2, 6 mW/cm2, 21.5 mW/cm2 and 44.6 mW/cm2 (plots 50, 52, 54 and 56, respectively) using a UVA light source with a spectral output centered at approximately 365 nm. There is an initial three second delay evident in each of the four plots before UV irradiation was initiated. The differences in the initial viscosities are attributable to variation in the sample temperatures.

FIG. 8 demonstrates how a greater UV irradiance enables a full cure to be achieved with shorter exposure duration. Similarly, the duration for the pre-cure is less for a greater irradiance. The change in viscosity from uncured to fully-cured can be less than 100 times to more than 1,000 times the viscosity of the uncured material.

According to the method 300, an elastomeric layer is provided (310) in an uncured state. The layer is irradiated (320) with UV light for a pre-cure duration which, for example, can be less than 10 seconds to several minutes or more, and is dependent on irradiance. By way of specific examples, the UV light may be emitted from an arc lamp (e.g., a mercury lamp) or one or more UV light emitting diode (LEDs). The UV irradiation of the elastomeric layer during pre-cure increases the viscosity of the layer to a level at which the layer is more resistant to flow. A lower irradiance requires a longer pre-cure duration; however, any variation in the increase in viscosity during the pre-cure due to differences in pre-cure durations for different fabrication runs is reduced. The preferred irradiance and duration for the UV pre-cure is based on the particular material used and the desired meniscus geometry (see FIG. 4) to sufficiently reduce thickness variations in the elastomeric layer.

After completing the pre-cure, the housing and bobbin are positioned (330) so that their ends extend into the elastomeric layer. Although the elastomeric material migrates after the placement of the housing and bobbin, the increased viscosity limits the size of the menisci formed along the housing and bobbin walls and, consequently, the thickness variations of the material are decreased relative to what otherwise would occur for placement in an uncured material. Subsequently, the elastomeric layer is irradiated (340) with UV light to achieve a full cure. The irradiance for the duration of the cure may be greater than the irradiance for the duration of the pre-cure. In addition, the duration of the cure may be substantially longer than the duration of the pre-cure and may be determined in part by the cure irradiance. Preferably, the UV source is configured with respect to the device so that the elastomeric layer is not shadowed by the housing or bobbin for spatial consistency of the curing process; however, a dual cure material that can be cured by UV radiation and/or the application of heat may be used to avoid problems associated with shadow zones.

The UV pre-cure and UV cure processes may be separately completed. For example, the two processes may utilize different UV light sources. In another example, the pre-cure UV light source may be on a process line and the cure UV light source may be a separate source configured for batch irradiation of large numbers of parts so that the process line throughput is not affected.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A method of fabricating a device having a compliant member, comprising:
providing an elastomeric layer in an uncured state;
pre-curing the elastomeric layer to increase a viscosity of the elastomeric layer;
positioning a bobbin and a housing each having an end such that the ends of the bobbin and the housing extend at least partially into the elastomeric layer and such that the bobbin is inside the housing; and
curing the elastomeric layer such that the elastomeric layer is secured to the bobbin and the housing.

2. The method of claim 1 wherein the pre-curing of the elastomeric layer comprises applying heat to the elastomeric layer to increase a temperature of the elastomeric layer to a first temperature.

3. The method of claim 2 wherein the curing of the elastomeric layer comprises applying heat to the elastomeric layer to increase the temperature of the elastomeric layer to a second temperature that is greater than the first temperature.

4. The method of claim 3 wherein the pre-curing occurs for a first duration and the curing occurs for a second duration, and wherein the first duration is less than the second duration.

5. The method of claim 1 wherein the pre-curing comprises irradiating the elastomeric layer with ultraviolet light for a first duration.

6. The method of claim 5 wherein the curing comprises irradiating the elastomeric layer with ultraviolet light for a second duration and wherein the second duration is greater than the first duration.

7. The method of claim 1 wherein the pre-curing of the elastomeric layer comprises irradiating the elastomeric layer with ultraviolet light at a first irradiance and the curing of the elastomeric layer comprises irradiating the elastomeric layer with ultraviolet light at a second irradiance, and wherein the second irradiance is greater than the first irradiance.

8. The method of claim 1 wherein the pre-curing comprises applying heat to the elastomeric layer and irradiating the elastomeric layer with ultraviolet light.

9. The method of claim 1 wherein the curing of the elastomeric layer comprises applying heat to the elastomeric layer and irradiating the elastomeric layer with ultraviolet light.

10. The method of claim 1 wherein the elastomeric layer is secured to the bobbin and the housing, the method further comprising removing a portion of the elastomeric layer that extends outside a diameter of the housing.

11. The method of claim 1 wherein the elastomeric layer in an uncured state comprises liquid silicone rubber.

12. A microspeaker device comprising:
an acoustic diaphragm having a substantially planar shape and formed of a single layer of a cured elastomeric material;
a housing having an end extending at least partially into the single layer, wherein the single layer adheres to a portion of the housing at the end of the housing to form a first meniscus having a height defined along a wall of the housing, wherein the height of the first meniscus is less than a height of a meniscus along the wall of the housing for an uncured state of the elastomeric material;
a bobbin disposed inside the housing and having a surface and an end extending at least partially into the single layer, wherein the single layer adheres to a portion of the bobbin at the end of the bobbin to form a second meniscus having a height defined along a wall of the bobbin, wherein the height of the second meniscus is less than a height of a meniscus along the wall of the bobbin for the uncured single layer of the elastomeric material; and a coil wound on the surface of the bobbin.

13. The microspeaker device of claim 12 wherein the first meniscus comprises a first inner meniscus having a height along an inner wall surface of the housing and a first outer meniscus having a height along an outer wall surface of the housing and wherein the second meniscus comprises a second inner meniscus having a height along an inner wall surface of the bobbin and a second outer meniscus having a height along an outer wall surface of the bobbin.

14. The microspeaker device of claim 12 wherein the housing and the bobbin are formed of different materials.

15. The microspeaker device of claim 12 wherein the height of the first meniscus is different from the height of the second meniscus.

* * * * *